United States Patent
Mercer et al.

(10) Patent No.: US 8,188,746 B2
(45) Date of Patent: *May 29, 2012

(54) TRACKING THE POSITIONAL RELATIONSHIP BETWEEN A BORING TOOL AND AT LEAST ONE BURIED LINES

(75) Inventors: John E. Mercer, Kent, WA (US); Albert W. Chau, Woodinville, WA (US)

(73) Assignee: Merlin Technology, Inc., Renton, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/987,033

(22) Filed: Jan. 7, 2011

(65) Prior Publication Data

US 2011/0101985 A1    May 5, 2011

Related U.S. Application Data

(60) Division of application No. 12/844,102, filed on Jul. 27, 2010, now Pat. No. 7,888,939, which is a division of application No. 12/139,776, filed on Jun. 16, 2008, now Pat. No. 7,786,732, which is a continuation of application No. 11/772,911, filed on Jul. 3, 2007, now Pat. No. 7,403,014, which is a continuation of application No. 11/436,019, filed on May 17, 2006, now Pat. No. 7,253,628, which is a continuation of application No. 11/074,115, filed on Mar. 7, 2005, now Pat. No. 7,071,695, which is a continuation of application No. 10/615,222, filed on Jul. 7, 2003, now Pat. No. 6,882,154, which is a continuation of application No. 09/751,478, filed on Dec. 28, 2000, now Pat. No. 6,617,854, which is a continuation of application No. 09/321,151, filed on May 27, 1999, now Pat. No. 6,191,585, which is a continuation-in-part of application No. 09/082,142, filed on May 20, 1998, now Pat. No. 5,914,602, which is a continuation of application No. 08/643,209, filed on May 3, 1996, now Pat. No. 5,757,190.

(51) Int. Cl.
*G01V 3/08* (2006.01)
(52) U.S. Cl. ........................................................ 324/326
(58) Field of Classification Search ........... 324/326–329
See application file for complete search history.

(56) References Cited

U.S. PATENT DOCUMENTS 862,499 A    1/1975    Isham et al.
(Continued)

OTHER PUBLICATIONS

Honeywell, One and Two Axis Magnetic Sensors, Feb. 1997, Honeywell Brochure.

*Primary Examiner* — Jay Patidar
(74) *Attorney, Agent, or Firm* — Pritzkau Patent Group, LLC

(57) ABSTRACT

An arrangement is described for tracking a positional relationship between a boring tool and at least one in-ground line. A first transmitter generates a magnetic locating field from one of the boring tool or at least an underground length of the line. A receiver is carried by the boring tool if the field is generated from the line, or connected to the line if the field is generated from the boring tool, for detecting an intensity of the magnetic locating field indicative of the positional relationship between the boring tool and the line. A second transmitter is carried by the boring tool for producing a locating signal. A portable locator uses the locating signal to determine a position of the boring tool and indicates the detected intensity of the magnetic locating field.

7 Claims, 8 Drawing Sheets

U.S. PATENT DOCUMENTS

| | | |
|---|---|---|
| 4,514,692 A | 4/1985 | Johnson et al. |
| 4,710,708 A | 12/1987 | Rorden et al. |
| 4,875,014 A | 10/1989 | Roberts et al. |
| 4,881,083 A | 11/1989 | Chau et al. |
| 4,972,703 A | 11/1990 | Ho |
| 5,084,678 A | 1/1992 | Hutin |
| 5,150,056 A | 9/1992 | Wilcock |
| 5,218,301 A | 6/1993 | Kuckes |
| 5,320,180 A | 6/1994 | Ruley et al. |
| 5,337,002 A | 8/1994 | Mercer |
| 5,343,152 A | 8/1994 | Kuckes |
| 5,585,726 A | 12/1996 | Chau |
| 5,589,775 A | 12/1996 | Kuckes |
| 5,621,325 A | 4/1997 | Draper et al. |
| 5,720,354 A * | 2/1998 | Stump et al. ............ 175/26 |
| 5,757,190 A | 5/1998 | Mercer |
| 5,914,602 A * | 6/1999 | Mercer ............ 324/326 |
| 6,313,755 B1 | 11/2001 | Hetmaniak et al. |
| 6,411,094 B1 | 6/2002 | Gard et al. |
| 6,459,266 B1 | 10/2002 | Fling |
| 7,282,920 B2 | 10/2007 | Mizuno |

\* cited by examiner

TRACKING THE POSITIONAL RELATIONSHIP BETWEEN A BORING TOOL AND AT LEAST ONE BURIED LINES

RELATED APPLICATIONS

The present application is a divisional application of application Ser. No. 12/844,102 filed Jul. 27, 2010 now U.S. Pat. No. 7,888,939; which is a divisional application of application Ser. No. 12/139,776 filed Jun. 16, 2008 and issued as U.S. Pat. No. 7,786,732 on Aug. 31, 2010; which is a continuation application of application Ser. No. 11/772,911 filed Jul. 3, 2007 and issued as U.S. Pat. No. 7,403,014 on Jul. 22, 2008; which is a continuation application of application Ser. No. 11/436,019 filed May 17, 2006 and issued as U.S. Pat. No. 7,253,628 on Aug. 7, 2007; which is a continuation application of application Ser. No. 11/074,115 filed Mar. 7, 2005 and issued as U.S. Pat. No. 7,071,695 on Jul. 4, 2006; which is a continuation application of application Ser. No. 10/615,222 filed Jul. 7, 2003 and issued as U.S. Pat. No. 6,882,154 on Apr. 19, 2005; which is a continuation application of application Ser. No. 09/751,478 filed Dec. 28, 2000 and issued as U.S. Pat. No. 6,617,854 on Sep. 9, 2003; which is a continuation application of application Ser. No. 09/321,151 filed May 27, 1999 and issued as U.S. Pat. No. 6,191,585 on Feb. 20, 2001; which is a continuation-in-part application of application Ser. No. 09/082,142 filed May 20, 1998 and issued as U.S. Pat. No. 5,914,602 on Jun. 22, 1999; which is a continuation application of application Ser. No. 08/643,209 filed May 3, 1996 and issued as U.S. Pat. No. 5,757,190 on May 26, 1998, all of which are incorporated herein by reference.

BACKGROUND OF THE INVENTION

The present invention relates generally to a system including an arrangement for tracking the positional relationship between a boring tool and one or more buried lines such as, for example, pipes, cables, conduits or other conductors and more particularly to an arrangement for indicating certain changes in the positional relationship between the boring tool and the lines based upon a particular characteristic of a magnetic field emanated from the boring tool or a magnetic field emanated from each one of the lines. In one aspect of the invention, an arrangement and associated method are provided for tracking the positional relationship between a boring tool and one or more buried lines using a composite magnetic signal.

The installation of utility lines underground is increasingly popular for reasons of aesthetics and for practical reasons such as, for example, protecting these lines from the effects of severe above ground weather conditions. However, in areas where buried lines have previously been installed, it is undesirable to excavate an entire pathway for the purpose of installing additional lines since such excavation many times results in the unintentional damage of an existing utility line. Areas which include buried fiber optic cables are particularly problematic for several reasons. First, a fiber optic cable is extremely difficult to repair once it has been severed or damaged. Second, because a fiber optic cable is capable of simultaneously carrying a vast amount of information, downtime can be quite costly.

In the past, various horizontal boring tool locating and monitoring systems have been developed which advantageously eliminate the need for excavating the entire pathway in which a utility line is to be installed. One such system is described in U.S. Pat. No. 5,337,002 (issued to the inventor of the present invention) which is incorporated herein by reference. FIG. 1 is taken directly from the '002 patent and illustrates a horizontal boring operation being performed by an apparatus which is generally designated by the reference numeral 10. Boring apparatus 10 includes a drill head 12 incorporating a transmitter which transmits a locating signal 14. A portable hand held receiver (locator) 16 is used to detect the locating signal through the intervening earth whereby to ultimately guide the boring tool to a terminating pit 18. The system relies on its operator having prior knowledge of any obstacles in the boring path of the tool such as an obstacle 20 so that the tool can be steered around the obstacle. Unfortunately, such prior knowledge may be inaccurate, if available at all. Moreover, the system of FIG. 1 does not by itself provide a direct indication of the relationship between a respective obstacle such as an in-ground line and the boring tool. Without this indication, the operator is in danger of possibly damaging an in-ground line with no forewarning. In view of the serious consequences of damaging certain buried lines, as described above, operators of boring tools are less and less willing to assume this risk.

As will be seen hereinafter, the present invention provides a highly advantageous arrangement and associated method for providing an operator with indications which warn the operator when a boring tool is approaching an in-ground obstacle such as a fiber optic cable. Dependent upon the specific indications provided to the operator, an appropriate course of action may thereafter be taken which assures that the boring tool will not damage the line. In another advantage, the present invention provides an arrangement which utilizes a composite magnetic signal in determining both the directional heading of the boring tool and the positional relationship between the boring tool and the underground line(s). The arrangement may be configured so as to enable simultaneous tracking of the positional relationship between the boring tool and a plurality of in-ground lines whereby to avoid physical contact of the boring tool with the lines.

SUMMARY OF THE INVENTION

As will be described in more detail hereinafter, there is disclosed herein a system in which a boring tool is moved through the ground in a region which includes at least one electrically conductive in-ground line. The system, like the system of FIG. 1, includes a boring tool. However, the system of the present disclosure includes an arrangement for tracking a specific positional relationship between the boring tool and at least one in-ground line. A first transmitter generates a magnetic locating field from one of either the boring tool or at least an underground length of the line. A receiver is carried by the boring tool if the field is generated from the line, or connected to the line if the field is generated from the boring tool, for detecting an intensity of the magnetic locating field indicative of the positional relationship between the boring tool and the line. A second transmitter is carried by the boring tool for producing a locating signal. A portable locator is configured to use the locating signal to determine a position of the boring tool within the region and to indicate the detected intensity of the magnetic locating field generated from either one of the line or the boring tool.

In one aspect of the present invention, a boring tool is moved through the ground in a region which includes at least one electrically conductive in-ground line and which is subject to static magnetic fields including the magnetic field of the earth. Tracking a positional relationship between the boring tool and the line, as well as determining a directional heading of the boring tool within the region are provided by: (i) generating a time varying magnetic field from the line; (ii)

at the boring tool, detecting a composite magnetic signal which includes one component affected by the static magnetic fields and another component affected by the time varying magnetic field such that the static magnetic field component varies as a function of the directional heading and the time varying component varies as a function of the positional relationship; and (iii) processing the composite magnetic signal to separate the static magnetic field component and the time varying magnetic field component from the composite magnetic signal for use in determining the directional heading and the positional relationship. In one feature, the static magnetic field component is used to determine the directional heading of the boring tool and the time varying magnetic field component is used to determine the positional relationship.

BRIEF DESCRIPTION OF THE DRAWINGS

The present invention may be understood by reference to the following detailed description taken in conjunction with the drawings, in which.

DETAILED DESCRIPTION OF THE INVENTION

Figure 1:
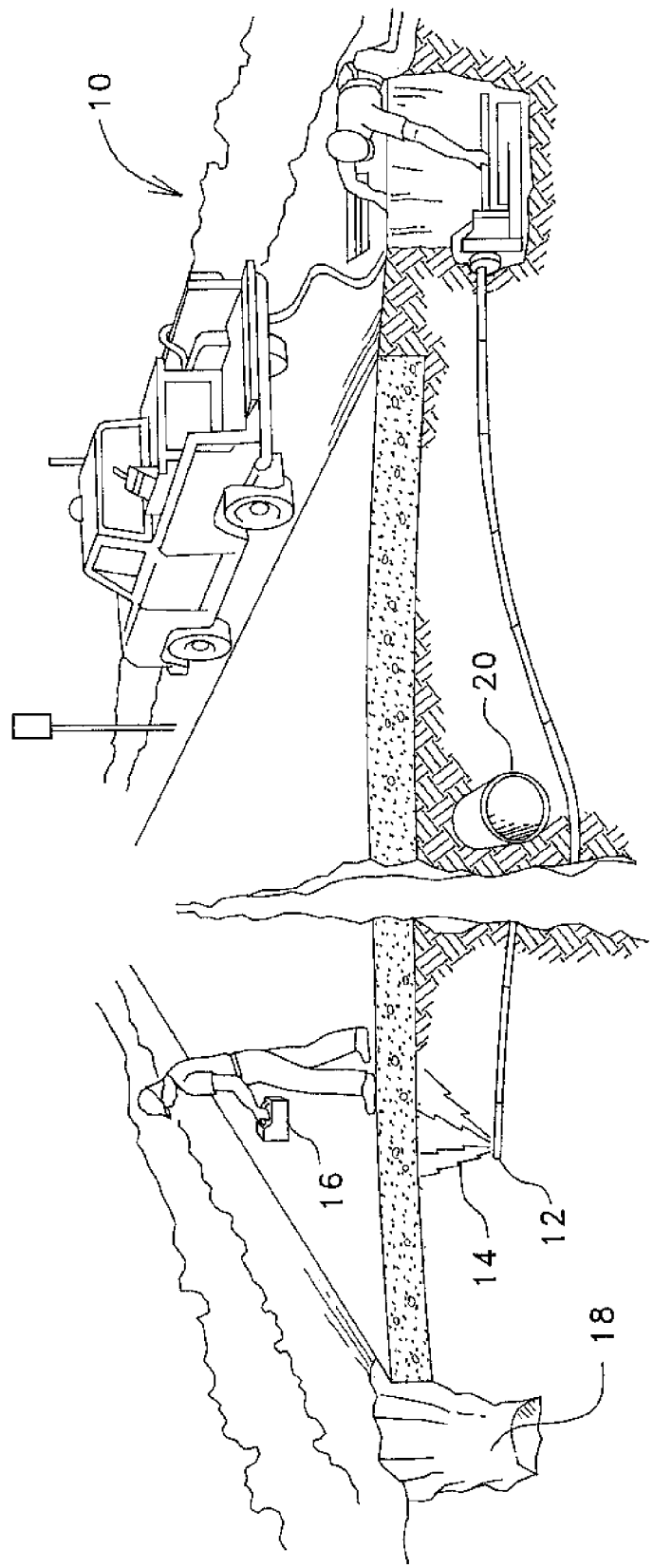
FIG. 1 is a cross-sectional view, in elevation, of a prior art horizontal boring operation which is taken directly from U.S. Pat. No. 5,337,002.
Figure 2:
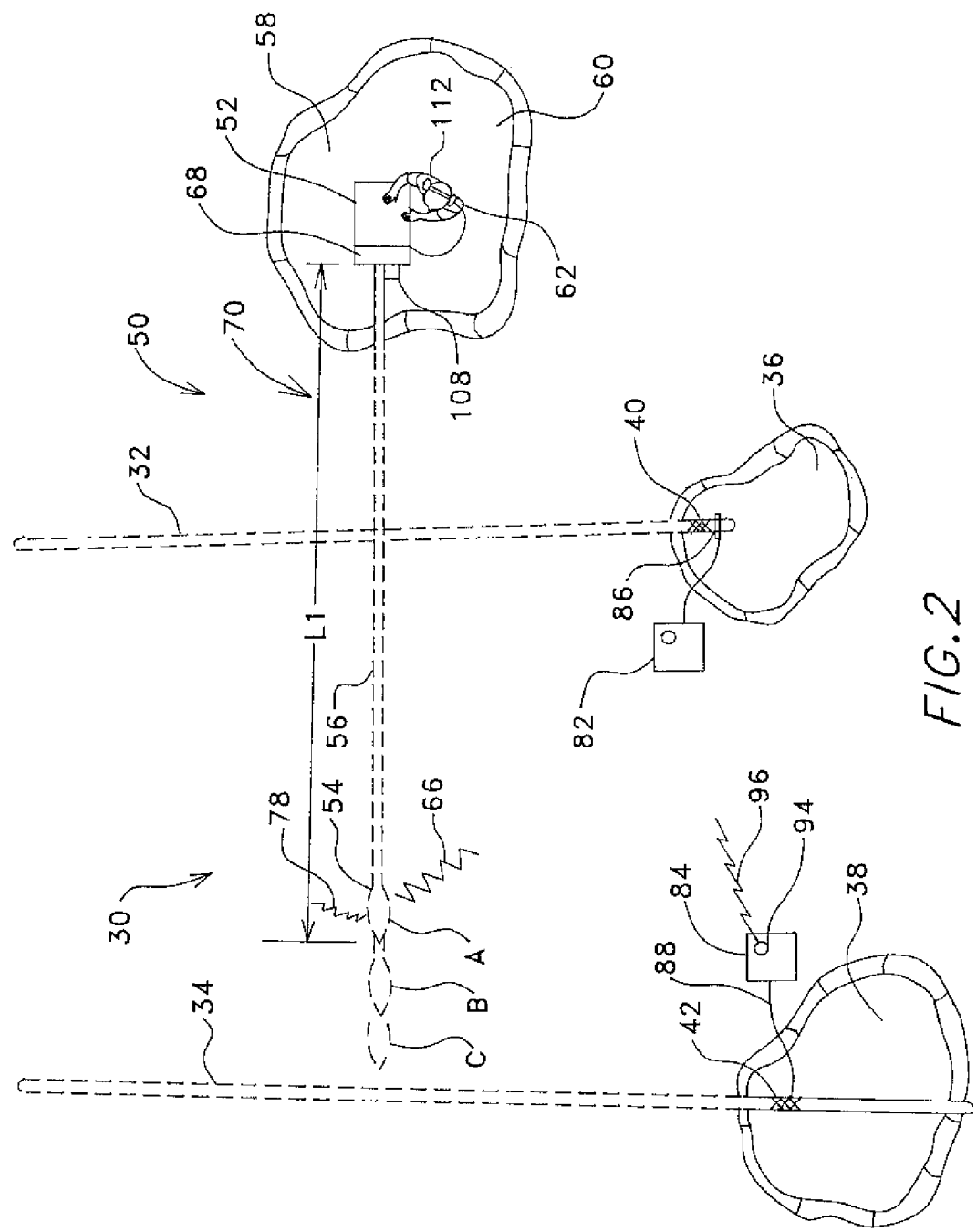
FIG. 2 is a diagrammatic plan view of a region in which a horizontal boring operation is being performed by a system manufactured in accordance with the present invention.

Having described FIG. 1 previously, attention is immediately directed to FIG. 2 which illustrates a plan view of a horizontal boring operation which is being performed in a region 30 having first and second in-ground lines 32 and 34, respectively. It is to be understood that two lines are shown for illustrative purposes only and that the present invention may be configured for use in regions which include any number of buried lines. First line 32 is partially accessible in a first pit 36, while second line 34 is partially accessible in a second pit 38 facilitating connections to either one of the lines. For purposes of the present invention, lines locatable within region 30 must include an electrically conductive component which extends along the length of the line. Even in fiber optic cables, an electrically conductive component is normally provided in the form of a shield or an electrically conductive locating lead. Such an electrically conductive component is useful for either emanating or for receiving a time varying magnetic field in accordance with Maxwell's equations. In the present example, line 32 includes a conductor 40 while line 34 includes a conductor 42. Although the present example shows direct connection to the lines, the transmitted or receiving signal on or from the line could be induced without direct connection.

Figure 3:
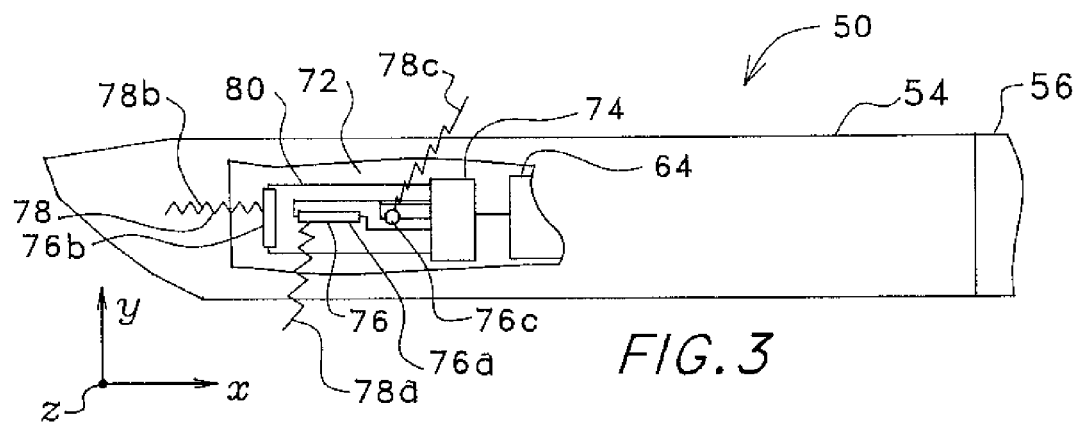
FIG. 3 is a diagrammatic cut-away view of a drill head including a magnetic locating field transmitter manufactured in accordance with the present invention.

Referring now to FIG. 3 in conjunction with FIG. 2, the horizontal boring operation is performed using a system manufactured in accordance with the present invention and generally designated by reference numeral 50. System 50 includes a boring tool 52 having a drill head 54 which is guided on a drill string 56, the latter of which extends from drill head 54 to an operator station 58 located in a pit 60 along with an operator 62. The process can also be conducted from the surface without the need for pit 60. It should be understood that when the claims refer to a boring tool, the drill head of the boring tool is specifically referenced. Boring tool 52 is typically of the guided type which is well known in the art and is configured to transmit information from a transmitter 64 as a signal 66 from various sensors (not shown) which are positioned in the drill head for detecting the orientation of the drill head including, for example, its pitch, roll and even possibly yaw. The configuration of these sensors, transmitter 64 and the specific construction of the drill head casing, which permits the emanation of the telemetry signal through the casing, are described in detail in the previously referenced '002 patent. Therefore, these descriptions will not be repeated herein for purposes of brevity.

A hand-held telemetry receiver or locator for providing indications based upon telemetry signal 66 is also described in the '002 reference. The present system does not require this locator, although it could be used as a means for relaying signal 66 to a telemetry receiver 68 or the signal could be transmitted directly to receiver 68 positioned at operator station 58. In this way, telemetry signal 66 provides indications regarding the orientation of the drill head directly (or indirectly) to operator 62 of system 50. It should be understood that telemetry receiver 68 may be provided integrally with boring tool 52 or in other embodiments may be provided in its own separate enclosure (not shown) which is positionable at operator station 58 by providing suitable means. Moreover, telemetry receiver 68 could form part of the handheld locator for processing signal 66 at the handheld locator. However, for purposes of simplicity, it will be assumed that the receiver is at the operator station.

Continuing to refer to FIGS. 2 and 3 and in accordance with the present invention, system 50 includes an arrangement which is generally indicated by the reference numeral 70 for tracking the specific positional relationships between drill head 54 and first and second lines, 32 and 34, respectively. Arrangement 70 includes a magnetic locating signal transmitter 72 which is positioned in drill head 54. Magnetic locating signal transmitter 72, in the present embodiment, includes a field transmission/control unit 74 and an antenna array 76 for transmitting a magnetic locating field 78. Antenna array 76 includes three separate, but essentially identical, antennas 76a, 76b and 76c which are arranged orthogonally with respect to one another and which may be, for example, dipole antennas. A plurality of electrically conductive leads 80 electrically interconnect the antenna array with field transmission/control unit 74 such that each antenna is individually connected with the transmission/control unit. Therefore, transmission of different signals from the individual elements which make up the antenna array is facilitated by simply driving each element with an appropriate drive signal. When transmission/control unit 74 is active, current flows through conductive leads 80 and antenna array 76. This current flow results in the emanation of magnetic locating field 78 from the antenna array along orthogonally opposed x, y and z axes, as indicated in FIG. 3, with the z axis being perpendicular to the plane of the figure. Magnetic field 78 includes an x axis component 78a emitted by antenna 76a, a y axis component 78b emitted by antenna 76b and a z axis component 78c emitted by antenna 76c. It is to be understood that each axis component is actually a three dimensional field. The transmission/control unit is configured to include circuitry which is dependent upon the specific way in which it is desired to transmit magnetic locating field 78. Power, which is presently available at the drill head, for the operation of telemetry transmitter 64 is also suitable for the operation of transmission/control unit 74. However, it should be appreciated that any well regulated power source may be utilized. It is to be understood that the circuitry for producing the antenna drive signals to be described immediately hereinafter and for receiving the magnetic fields generated thereby at the telemetry receiver may be readily provided by one having ordinary skill in the art and may be embodied in many different forms within the scope of the present invention. Field 78 is separate and distinct from telemetry signal 66 by any suitable means, such as frequency differentiation or time modulation.

Referring now solely to FIG. 2, magnetic locating field 78 is incident upon lines 32 and 34 within region 30. Arrangement 70 includes field strength detectors 82 and 84 which are in communication with the respective conductors of lines 32 and 34. Several different techniques may be utilized to couple the signal induced within each conductor by the magnetic field to its respective field strength detector. For example, detector 82 is inductively coupled with conductor 40 using an inductive clamp arrangement 86 of the type which is well known in the art. Detector 84, on the other hand, is coupled with conductor 42 of line 34 using a simple electrically conductive lead 88.

Figure 4:
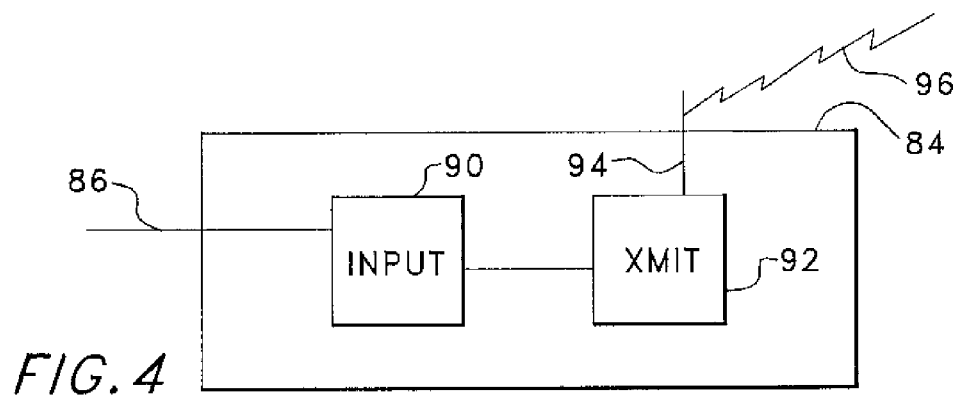
FIG. 4 is a block diagram illustrating one configuration of a field strength detector of the present invention.

Turning now to FIG. 4, each of detectors 82 and 84 are essentially identical internally and incorporate circuitry which is readily providable by one having ordinary skill in the art. For purposes of simplicity, only detector 84 is depicted in block diagram form. The signal induced by field 78 in conductor 42 of line 34 is transferred to detector 84 via inductive clamp arrangement 86. Thereafter, an input circuitry block 90 processes the induced signal as needed using, for example, amplification and filtering circuitry (neither of which is shown). This processed signal is then transferred to a transmitter block 92. Typically, the processed signal is applied to a carrier (not shown) by, for example, frequency modulation and transmitted from an antenna 94 as a detection signal 96. Signals (not shown) from other detectors in the system such as, for example, detector 82 are also modulated onto individual carriers.

Figure 5:
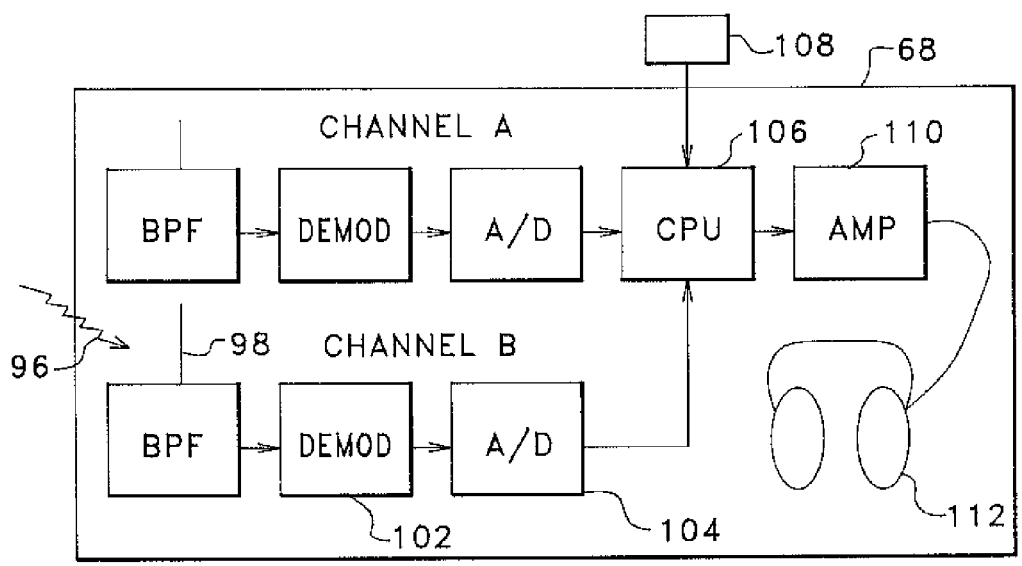
FIG. 5 is a block diagram illustrating one configuration of a telemetry receiver of the present invention.

Turning now to FIGS. 2 and 5, signal 96 from detector 84 along with signals from other detectors forming part of the system are received by telemetry receiver 68 at operator station 58. Telemetry station 68 includes circuitry which is readily providable by one having ordinary skill in the art and is configured to receive the detector signals in a way which distinguishes the signals from one another. In the present example, the telemetry receiver includes channel A for detector 82 and channel B for detector 84. Similar channels may be provided for any other lines being monitored. Another method of communication is to time share one channel, but this discussion will be limited to using two channels for purposes of clarity. Since each channel incorporates essentially identical functional blocks, the present descriptions will be limited to channel B. The frequency modulated signal 96 transmitted by detector 84 is received by an antenna 98 and then passed by a sufficiently narrow band pass filter 100 having a center frequency which is centered on the carrier frequency of signal 96. The signal is then passed to a demodulator 102 whereby to recover the original detected signal. Thereafter, the detected signal is passed to an analog to digital converter (A/D) 104, whereby to convert the signal into an appropriate digital format. Following conversion by the A/D, the digital information is transferred to a Central Processing Unit (CPU) 106 for processing. Telemetry receiver 68 may incorporate a number of other functional blocks, if desired. For example, a mixer (not shown) can be used to heterodyne the modulated carrier to a lower frequency.

Continuing to refer to FIGS. 2 and 5, CPU 106 also receives data from a drill string monitoring unit 108. The latter provides data to CPU 106 including parameters such as the overall length L1 of drill string 56 as well as the current rate at which the drill string is being fed out. Further description of the internal configuration of drill string monitoring unit 108 will not be provided herein since methods and apparatus for determining the parameters of interest are readily provided by one having ordinary skill in the art. Alternatively, the actual length L1 of the drill string could also be monitored visually by the operator and entered into the CPU manually.

Using the above-described input data, CPU 106 performs an analysis of changes in the magnitude of the intensity of the locating field in a predetermined way, which will be described hereinafter, and relates these intensity changes with movement of the drill head whereby to generate indications as to the positional relationship of each monitored line with the drill head. Specific aspects of this analysis will be described at appropriate points hereinafter. In the present example, CPU 106 is configured to generate indications of the positional relationships in the form of predetermined audio signals. These audio signals are transferred to an audio amplifier 110 for amplification. The amplified audio signals are then presented to the system operator via a pair of headphones 112 and/or via a remote speaker (not shown). It should be mentioned that signals received from any number of detectors may be processed by the CPU as provided by each separate channel within the telemetry receiver and that the CPU is itself specifically configured to separately track the positional relationship for each line with the drill head. In this regard, receiver 68 would include a readily providable multiplexer (not shown) positioned at the input of the receiver for multiplexing the different input signals to the various channels or positioned to receive outputs from the CPU to, for example, multiplex the audio signals to the operator, which audio signals could have different tones.

Figure 6:
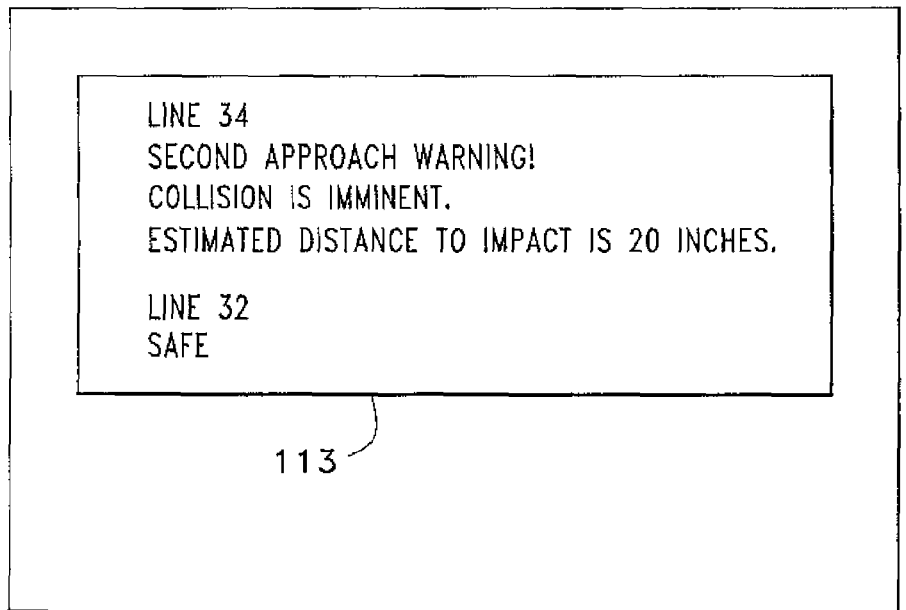
FIG. 6 is a diagrammatic illustration of a visual display of indications provided in accordance with one embodiment of the present invention.

Referring to FIG. 6, in other embodiments, indications may be provided to the system operator in forms other than or in combination with audio signals. For example, telemetry receiver 68 may incorporate a flat panel display 113 which provides a visual indication as to the various positional relationships between the monitored lines and the drill head. All of these configurations are considered to be within the scope of the present invention provided that the system operator remains apprised of the indications being provided. It should also be mentioned that the arrangement of the field strength detectors in combination with the telemetry receiver may be configured in many other ways, as compared with the arrangement of FIG. 2. For example, in one alternative embodiment, the detectors may be hard-wired to the telemetry receiver, avoiding the need for a wireless link therebetween. In still another alternative embodiment, particularly in cases where the detector connections to the monitored lines are made nearby the boring tool, the detector circuitry may be incorporated directly into telemetry receiver 68. In yet a further alternative, the detector signal could be transmitted to the receiver via the locator, as indicated previously.

The discussion above generally describes the components which make up a system in accordance with one embodiment of the present invention. As described, the system provides indications as to the positional relationship of the drill head with the lines being monitored by the system. In order to provide a high degree of accuracy in indications issued by the system, the present invention advantageously utilizes a vector sum derived from preselected components of the magnetic locating field generated by the system and present within region 30. The preselected components of the field which are monitored may include any combination of one or more components of the field oriented in space along three orthogonally disposed axes dependent upon the particular monitoring application encountered. Of course, in an application where only one component is monitored, the magnitude of the vector sum simply comprises the magnitude of that particular component.

Generally, the vector sum concept used herein is most useful with magnetic locating fields which exhibit monotonic variations in the magnitude of their vector sum with distance. In other words, as the source of the overall field is approached, the intensity of the field displays a continuous increase. A locating field possessing this characteristic yields unambiguous distance relationship indications throughout region 30. At this juncture, it is sufficient to say that the characteristics of the locating field and the way in which the vector sum is derived are important considerations which should not be overlooked in configuring the system for a particular application.

The magnetic locating field can be generated from the drill head and detected at the monitored lines, as in the embodiment described immediately above, or the field can be generated from the monitored lines in region 30 and detected at the drill head, as will be seen below in one preferred embodiment. Magnetic locating fields can be generated and detected in virtually an unlimited number of ways within the scope of the present invention. It is to be understood that the monitoring options provided by the various embodiments of the invention disclosed herein are intended to encompass the greatest possible range of orientations between the drill head and the monitored lines. These options provide an operator with a degree of flexibility and selective accuracy which has not been seen heretofore. Therefore, the specific embodiment which is useful in a particular orientation could be determined in view of, for example, any advance knowledge of the orientation of the boring tool with the cables being monitored.

Reference will now be taken to two examples which follow immediately hereinafter illustrating two different approach paths of the drill head to a monitored line. These paths will be described as being monitored by the embodiment of FIG. 2 in which the magnetic locating field or signal is transmitted from the drill head such that the field will ultimately provide a vector sum which increases in a monotonic fashion as a monitored line is approached.

Figure 7:
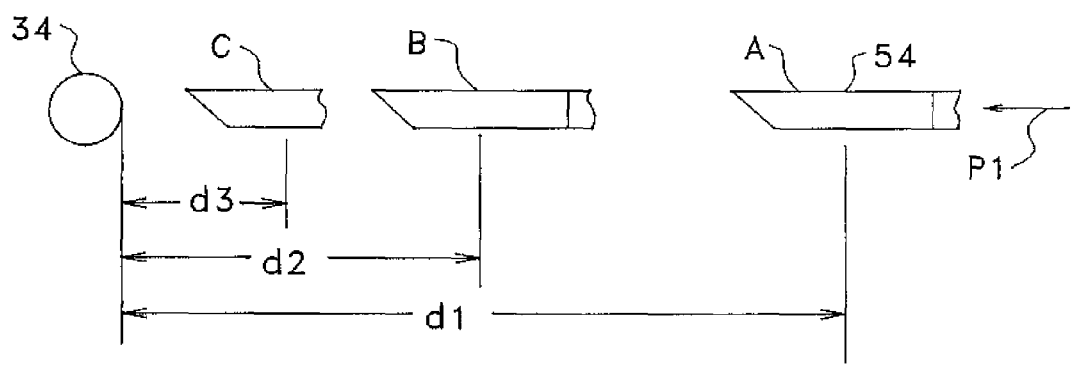
FIG. 7 is a diagrammatic elevational view illustrating a drill head on a perpendicular approach path P1 relative to an in-ground line monitored by the system of the present invention.

Referring now to FIG. 7 in conjunction with FIGS. 2 and 3 and in accordance with a first approach path example, drill head 54 is illustrated on a collision course with line 34. It is also noted that in this example, line 34 is oriented perpendicular to drill string 56. In this orientation, the magnetic locating field may be transmitted from the drill using only antenna 76*b* which transmits the y axis component of locating field 78. This y axis component will provide for a true indication of the distance to line 34. Three positions of drill head 54 successively approaching line 34 along a path P1 (shown by an arrow) are indicated as A, B and C. Positions A, B and C are at distances d1, d2 and d3, respectively, from line 34 wherein d2 is equal to one-half of d1 and d3 is equal to one-half of d2. As the drill head approaches line 34, the induced signal strength can be shown to increase inversely with the distance of the drill head from the line. At a certain predetermined magnetic field intensity, corresponding to a given distance, an initial indication is provided by CPU 106 that the drill head is approaching line 34. In this particular example, the initial indication is provided at distance d1. At this distance, the operator of the boring tool knows that the drill head is at a safe distance from the line. However, further indications may warn the operator of an impending collision or at least of the risk of a collision. These indications are provided based upon predetermined relative increases in the magnetic field intensity. While indications herein are based on a relative halving of the distance, other relative factors (25% decrease, etc.) may be effectively used.

Continuing with the first approach path example, should the operator proceed, following the initial indication at position A, the drill head will reach position B. As the boring operation continues, CPU 106 continuously correlates data from drill string monitoring unit 108, regarding forward movement of the drill head, with the magnetic field intensity data. Correlation of these data is useful in certain orientations for estimating the distance to the monitoring line and for predicting a collision with the line. At position B, the detected magnetic field strength will be greater than its strength at position A, since the distance between the drill head and the line is now d2, which is less than d1. At d2, CPU 106 will issue a second indication to the operator which advises that the drill head has reduced its distance to the line by a predetermined fraction since the initial warning was provided. Should the operator once again decide to proceed, the drill head will reach position C. At position C, a third indication is issued, once again advising the operator that the drill head has reduced its distance to the line by the same predetermined fraction since the last indication and, therefore, that the strength of the magnetic field has increased by the same predetermined relationship. If the operator proceeds, indications will continue to be provided each time the detected magnetic field strength doubles. If the drill head is heading toward the line at an essentially uniform rate of speed, it should now be evident that these indications will occur at a rapidly increasing rate corresponding with a geometric progression. For example, if the predetermined magnetic field increase corresponds to halving the distance and the initial indication is provided at time $t_1$, a second indication is provided at time $t_2$ and a third indication is provided at a time $t_3$ which is $\Delta t/2$ after $t_2$ wherein $\Delta t$ is equal to $t_2-t_1$. A fourth indication will then be provided at time $t_4$ which is $\Delta t/4$ after $t_3$, etc.

In the perpendicular approach path example of FIG. 7, the correlation of data described above regarding the feed rate or actual feed distance of the drill string in conjunction with the detected rate at which the magnetic field intensity is increasing will specifically indicate that the detected intensity of the magnetic field is increasing at the most rapid possible rate. Under these specific circumstances, CPU 106 may be configured to indicate to the operator that the drill head is on a collision course with the line by, for example, a sustained audio tone or by a visual warning such as the one illustrated for Line 1 in FIG. 6 which includes an estimated distance to impact or collision. Of course, the operator should stop the boring operation upon receipt of such an indication.

Figure 8:
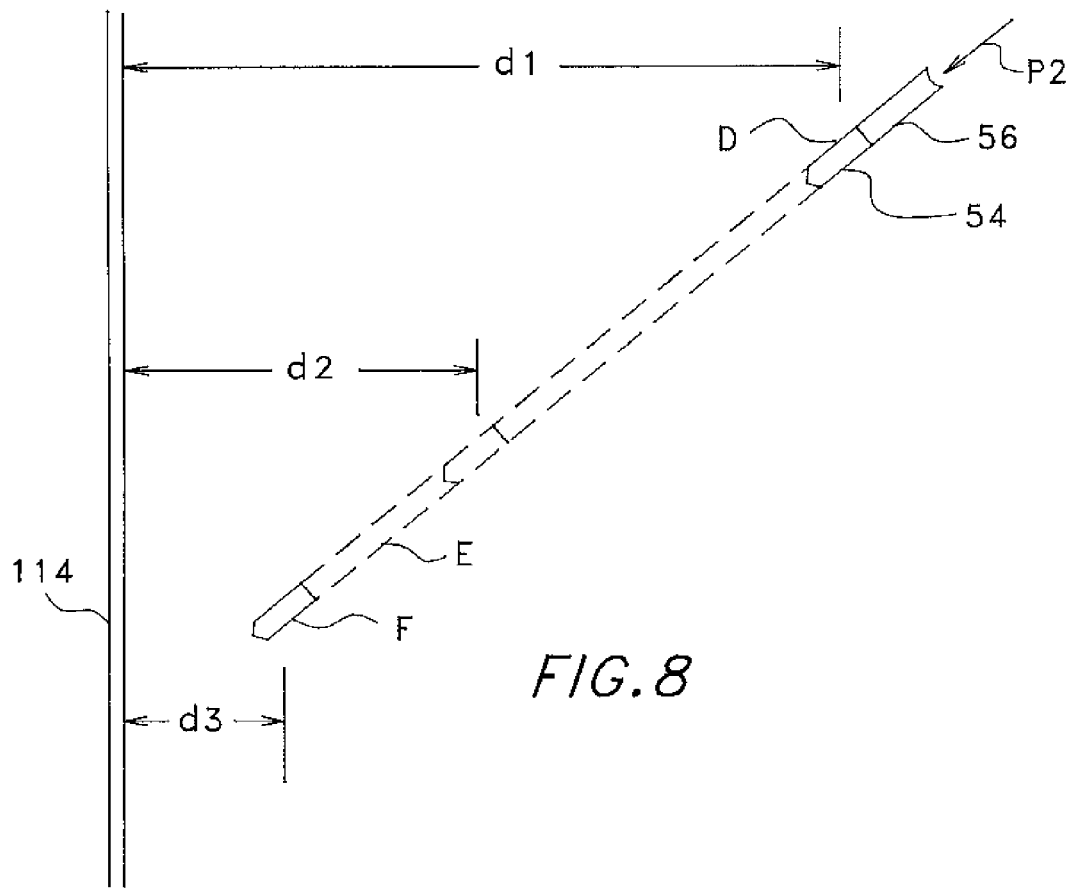
FIG. 8 is a diagrammatic plan view illustrating a drill head on a skewed approach path, P2, relative to an in-ground line monitored by the system of the present invention.

Turning now to FIG. 8, which diagrammatically illustrates a second approach path example, a line 114 is monitored by the system of the present invention. Drill head 54 is approaching line 114 on a collision course approach path P2 (indicated by an arrow) which is skewed to the path of the line. As the head approaches, it also rotates about its longitudinal (x) axis. For reasons which will become evident hereinafter, drill head 54 is shown approaching line 114 at successive positions D, E and F which are at distances d1, d2 and d3 (identical with those distances shown in FIG. 7) from line 114. As described above, drill head 54 is configured with antenna array 76 which transmits magnetic locating signal 78 from the drill head along three orthogonally disposed axes. It is noted that in this approach path, care must be taken in selecting an appropriate locating field transmission scheme in order to arrive at a properly derived value for the vector sum which is not subject to ambiguous readings resulting from peaks or troughs which may be present in the magnetic locating field. To that end, the signal from which the vector sum is derived for approach path P2 will be induced in line 34 by the y and z components (see FIG. 3) of signal 78 which are emitted by antenna elements 76b and 76c, respectively. There is no need to transmit a locating field having an x axis component if, for example, the system operator knows that this is the particular operational situation to hand. In fact, transmission of x axis component could result in peaks and/or troughs in field intensity, if it is simultaneously transmitted with other components. It should be noted that a locating field which is simultaneously transmitted at the same phase and frequency from antennas 76b and 76c will contain peaks and troughs such that the overall locating field does not necessarily exhibit a monotonically increasing intensity as the drill head approaches, resulting in possible ambiguous indications as to the positional relationship.

In order to avoid this possible ambiguity, the locating field is generated alternately at predetermined intervals from antennas 76b and 76c, respectively. At a signal strength detector (not shown) connected with line 114, a time average is taken based upon the signal induced by each component and the magnitude of the vector sum is calculated by CPU 106. Circuitry for arriving at this particular vector sum is readily providable by one having ordinary skill in the art and is therefore not illustrated.

Use of the vector sum is advantageous in one aspect in that, at distance d1, the magnitude of the vectoral sum of the magnetic locating signal components induced in line 114 is identical at this distance irrespective of the specific drill head approach path relative to the line. In other words, the magnitude of the induced signal will be identical at position A of FIG. 7 and at position D of FIG. 8 because in each case the drill head is at distance d1 from lines 34 and 114, respectively. Also, the magnitude of the induced signal will be identical at distance d2 and once again at distance d3. Therefore, CPU 106 issues an initial indication to the operator based on the field strength at position D and, thereafter, at points where the relative intensity of the field has doubled, as in the previous example. These subsequent indications will be provided at position E and then again at position F corresponding with distances d2 and d3. Unlike the previous example, however, analysis by CPU 106 of the drill string feed rate provided by drill string monitoring unit 108 in view of the detected rate at which the field strength is increasing and/or total feed length L1 will result in a determination that a collision will occur after traveling a greater distance along path P2 than the distance along path P1 at the same signal strength. That is, the system provides a path length distance to line 34 rather than a perpendicular distance from the line.

Referring once again to FIG. 2 and returning to a discussion regarding the monitoring of a plurality of lines within region 30, because CPU 106 is configured to individually track the positional relationship for each line being monitored, indications provided to the operator may also readily indicate the specific line for which the indications are applicable. For example, in the embodiment of the invention illustrated in FIG. 2, audio indications which are provided to operator 62 applicable to line 32 may be prefaced by a single, distinct beep or tone sustained for a predetermined interval. Indications which are applicable to line 34 may be prefaced, for example, by a double beep or separate tone. In this way, indications for any number of monitored lines may be distinctly recognized. Visual formats may, for example, display information regarding the status of each monitored line. FIG. 6, shows the status for lines 34 and 32 (using like reference numbers for purposes of simplicity) including a collision warning for line 34. One skilled in the art will appreciate that the operator of the system may be apprised in an unlimited number of ways as to which line specific indications pertain, using different visual formats and different frequency tones. These variations are all considered to be within the scope of the claimed invention.

As previously mentioned, a magnetic locating field may be transmitted from the drill head and detected at the monitored lines in a number of different ways. The intent of these transmission options is to reduce or eliminate troughs and peaks in the magnetic locating signal which may cause ambiguous indications. It is to be understood that the circuitry for producing the antenna drive signals to be described immediately hereinafter and for receiving the magnetic fields generated thereby at the telemetry receiver may be readily provided by one having ordinary skill in the art and may be embodied in many different forms within the scope of the present invention.

Figure 9:
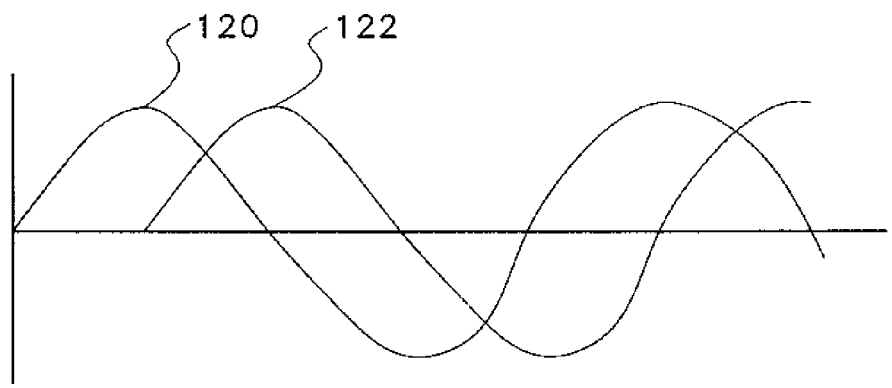
FIG. 9 illustrates drive signals providable by the locating field transmitter shown in FIG. 3 to its orthogonal antenna elements.

FIG. 9 illustrates antenna drive signals produced by one embodiment of transmitter 72 in which two elements at a time of the antenna array are driven by the same frequency sinusoidal waveforms 120 and 122 which are phase shifted by 90° with respect to one another. Transmission is alternately switched between three successive pairs, 76a/76b, 76b/76c and 76a/76c, of the three element antenna array such that the overall locating field is transmitted from three orthogonally disposed axes. As an example, the antenna element pairs may be driven at a frequency of 80 kHz and the pairs are switched at a 1 kHz rate. A simple low pass filter (not shown) having a roll-off frequency at approximately 100 Hz may be incorporated in telemetry receiver 68 for removing the components of the 1 kHz switching frequency and providing an output signal which is directly proportional to the average detected strength of the detected magnetic locating field. In the example shown in FIG. 8, driving the y and z axis antennas with the drive signals contemplated by FIG. 9 would eliminate the effects of rotation about the x axis and provide the desired monotonically increasing field strength at line 34.

Another embodiment of transmitter 72 is configured to simultaneously drive the three antennas at slightly different frequencies using sinusoidal waveforms (not shown). For example, antenna 76b might be driven at 80 kHz while antenna 76a is driven at 100 Hz below 80 kHz and antenna 76c is driven at 100 Hz above 80 kHz. The received signal is then averaged over a period which is long compared with 100 Hz.

Many modifications may readily be performed in accordance with the teachings of the present invention by one having ordinary skill in the art in order to embody still other forms of the present invention. For example, in one highly advantageous modification, the locating signal may be transmitted by the monitored lines, as will be described immediately hereinafter.

Attention is now immediately directed to FIG. 10, which once again illustrates area 30 in which a horizontal boring operation is being performed using another embodiment of a system manufactured in accordance with the present invention and generally designated by reference numeral 200. System 200 includes previously described boring tool 52 having drill head 54 positioned on drill string 56. Telemetry signal 66 is transmitted from a transmitter 64 (shown in FIG. 11) within the drill head. In the interest of brevity, descriptions of other like components will not be repeated.

In accordance with the present invention, system 200 includes an arrangement which is generally indicated by reference numeral 220 for tracking the specific positional relationships between drill head 54 and first and second lines, 32 and 34, respectively. Arrangement 220 includes a first field signal transmitter 222 in electrical communication with conductor 40 of first line 32 via an electrically conductive lead 224 and a second field signal transmitter 226 in electrical communication with conductor 42 of second line 34 via an electrically conductive lead 228 or inductive clamp. In this preferred embodiment, each of the field signal transmitters is essentially comprised of a readily providable oscillator which oscillates at a predetermined fixed frequency whereby to drive the electrically conductive component of its associated line at this fixed frequency. Although we will describe the system as using two frequencies f1 and f2, a single time shared frequency could be employed. First line transmitter 222 oscillates at a frequency f1 while second line transmitter 226 oscillates at a frequency f2. A first magnetic locating field 230 is emanated from line 32 at frequency f1 while a second magnetic locating field 232 is emanated from cable 34 at frequency f2. It should be noted that locating fields 230 and 232 exhibit a desired monotonic increase in intensity with no troughs or peaks present in the field as the lines are approached.

Figure 10:
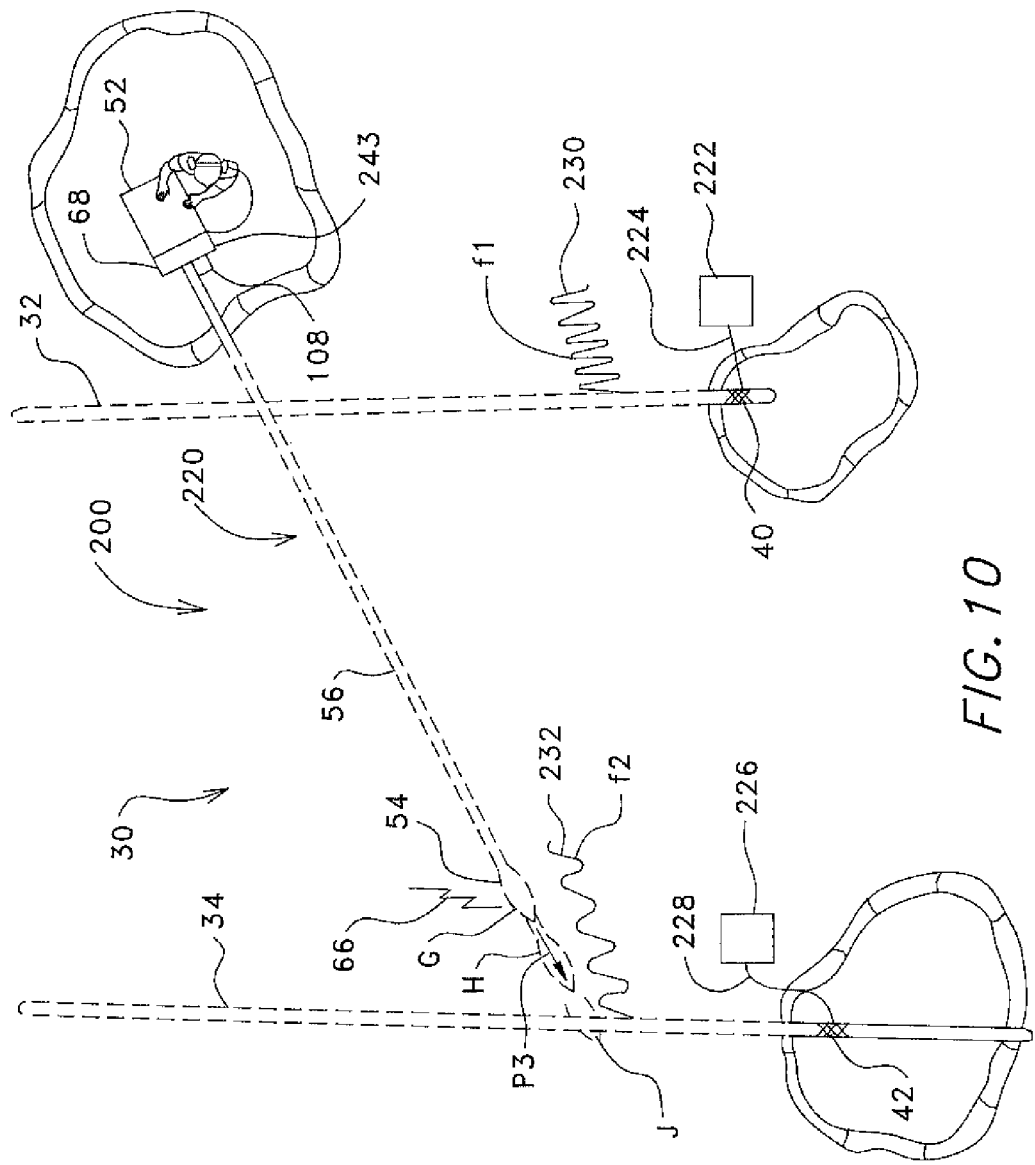
FIG. 10 is a diagrammatic plan view of the region originally shown in FIG. 2 in which a horizontal boring operation is being performed by another embodiment of a system manufactured in accordance with the present invention in which magnetic locating fields are transmitted directly from the lines being monitored.
Figure 11:
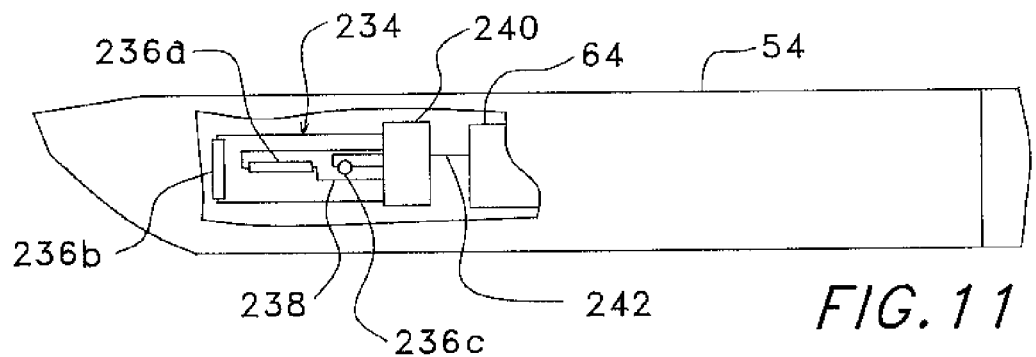
FIG. 11 is a cut-away view of a drill head used with the embodiment of FIG. 10 illustrating a magnetic locating signal receiver positioned within the drill head.

Continuing to refer to FIG. 10 and referring to FIG. 11, arrangement 220 includes a locating signal receiver 234 positioned within drill head 54. Locating signal receiver 234 includes an antenna array 236 comprised of three orthogonally opposed antennas 236a, 236b and 236c which may be, for example, dipole antennas. A plurality of electrically conductive leads 238 electrically interconnect the antenna array with a locating signal receiver/discriminator 240. Although, antennas 236 are shown as being individually connected with receiver/discriminator 240, they may alternatively be connected in series with one another (not shown) to the receiver/discriminator. Receiver/discriminator 240 cooperates with the orthogonal arrangement of antenna array 236 whereby to detect the intensity of each of magnetic fields 230 and 232 as a vector sum. A lead 242 electrically connects receiver/discriminator 240 with previously described transmitter 64 for transmitting coded magnetic field strength data from the transmitter via telemetry signal 66.

Figure 12:
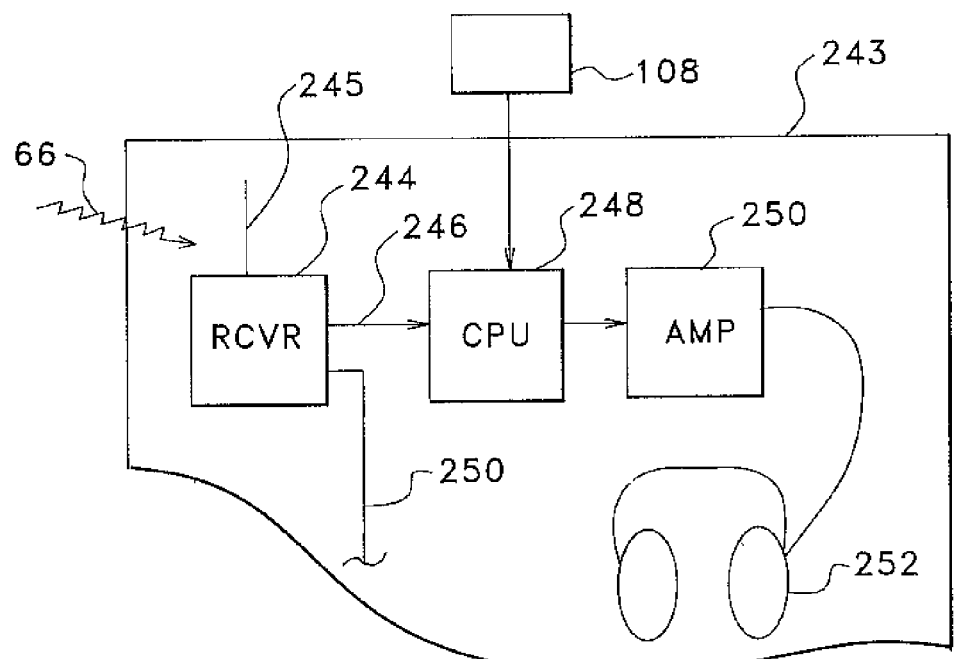
FIG. 12 is a partial block diagram illustrating one configuration of a telemetry receiver for use with the embodiment of FIG. 10.

Referring now to FIG. 12 in conjunction with FIGS. 10 and 11, the illustrated portion of a telemetry receiver 243 shows a receiver 244 which receives telemetry signal 66 including the magnetic field data. Receiver 244 initially receives signal 66 via an antenna 245. Thereafter, the receiver outputs the detected magnetic field strength data on a line 246 to a CPU 248. It should be appreciated that receiver/discriminator 240 may provide detected field strength data to the cooperating CPU via the intervening wireless link in an unlimited number of ways. For example, receiver/discriminator 240 may digitally encode data (not shown) which indicates the vectoral sum detected during a particular interval for one of the monitored lines. The data for the respective lines may then be multiplexed using readily providable circuitry and then transferred to transmitter 64 via lead 242. Other data derived from signal 66 is output on a line 250 to appropriate sections of the telemetry receiver which are devoted to functions such as, for example, analyzing drill head sensor information or depth.

In accordance with the present invention, CPU 248 is configured to analyze the magnetic field strength data in conjunction with data from drill string monitoring unit 108 so as to provide indications in a manner similar to that described with regard to previously described CPU 106 in FIG. 5. These indications are provided to operator 62 via an audio amplifier 250 and headphones 252 or in a visual format as shown previously, for example, in FIG. 6. System 200 provides highly accurate indications as to a broad range of positional relationships including those previously described. Accurate indications are also provided for the still further complex positional relationship shown partially by FIG. 10, as will be described in detail immediately hereinafter.

Figure 13:
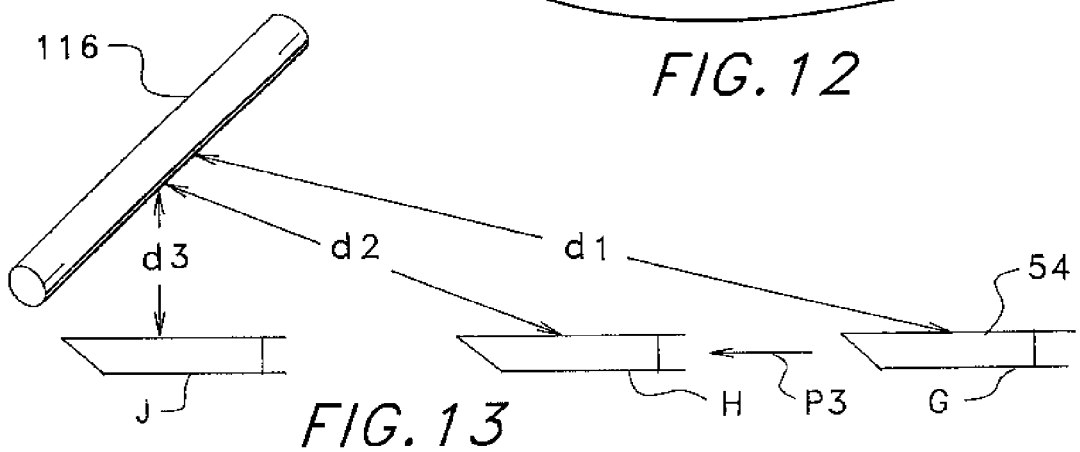
FIG. 13 is a diagrammatic elevational view illustrating a drill head on an approach path P3 which avoids an in-ground line being approached and which is skewed relative to the line. The latter being monitored by the system of the present invention.

Referring to FIG. 13 in combination with FIGS. 10 and 11, drill head 54 is diagrammatically illustrated proceeding on an approach path P3 (indicated by an arrow) toward line 34 which is skewed relative to the line and which represents a course which would ultimately avoid a collision with the line. The drill head is shown at positions G, H and J nearing line 34. Like the previous examples, the illustrated drill head positions are at distances d1, d2 and d3, respectively, from the line. For purposes of simplicity, the embodiment of system 200 is configured in a manner similar to the previously described embodiment which provides an initial indication at a locating field intensity resulting in an overall vector sum magnitude corresponding to distance d1 at position G. Thereafter, indications are provided at points d2 and d3 corresponding with positions H and J, respectively, at which the magnetic field magnitude doubles relatively. It is noted, that the use of relative doubling in intensity is arbitrary. However, in this example, d3 at position J represents the nearest approach of the drill head to the line. Assuming that, for example, the system operator is willing to receive four indications prior to terminating the illustrated boring operation, the indication at position J represents only the third indication received by the operator. Upon proceeding, the operator anticipates a fourth indication, however, no further indications are received since the drill head safely passes under the line at position J whereupon the detected vector sum intensity begins to decrease. In the event that a fourth indication were received by the operator, the boring operation should cease and steps should be taken to ensure that a collision is avoided. In this particular scenario, the system of the present invention has advantageously provided indications to the system operator that the drill head is on a safe approach path relative to line 34 whereby to permit expedient completion of the boring operation. CPU 248 in cooperation with drill string monitoring unit 108 could predict that there would not be an impact based on the distance moved versus related data as to the strength of the magnetic field.

Receiver/discriminator 240 and field signal transmitters 222 and 224 may be configured in an unlimited number of ways in accordance with the present invention. For example, the fields can be transmitted at different frequencies f1 and f2, as described, from the field signal transmitters. In this case, the fields may be continuously transmitted and the receiver discriminator includes circuitry which is readily providable such as, for example, band pass filters having center frequencies at f1 and f2 for distinguishing the signals from one another. Alternatively, the field signal transmitters may be cooperatively configured so as to alternately transmit their respective magnetic locating fields at predetermined intervals. Receiver/discriminator 240 then alternately detects each respective field. In fact, the use of this scheme permits the fields to be transmitted at the same frequency with f1 equal to f2. It is noted that circuitry for implementing this configuration is also readily providable by one having ordinary skill in the art.

Regardless of the way in which the receiver/discriminator cooperates with the field signal transmitters, field strength data for each line is then transferred to previously described transmitter 64 via 242 for subsequent transmission to telemetry receiver 243 as part of signal 66 which also contains data derived from orientation sensors (not shown) present in the drill head. Telemetry receiver 243 is positioned at operator station 58 or may be incorporated into a locator (such as locator 16 shown in FIG. 1). In another modification, a locator (not shown) can receive one telemetry signal from the drill head and transmit another telemetry signal back to receiver 243. In this manner, the locator acts like a repeater station with or without intermediate processing.

The use of the vector sum concept in this preferred embodiment is highly advantageous in that it provides a high degree of accuracy in the indications given to the operator of the system upon approaching a particular line, irrespective of the approach path or the orientation of the drill head with respect to the approached line. It should be appreciated that path P3 in FIG. 13 represents a complex, but common, approach path.

Like previously described embodiments, the embodiment described with regard to FIGS. 10 through 13 may be modified in any desired way as required by a particular application. For example, the vector sum may be determined by using one or two antennas, rather than three. However, one having ordinary skill in the art will appreciate that such modifications will not normally be necessary when this embodiment is used. While this embodiment is accompanied by a number of advantages, one particular advantage resides in the fact that the drill head often rotates as it advances. Such rotation does not affect positional relationship indications in this embodiment since the vector sum is indicative of the field strength irrespective of the orientation of the drill head with the line.

In view of the preceding examples, the system of the present invention is seen to be highly advantageous over prior art techniques and apparatus in each approach path described. While only three approach paths have been described, it will be appreciated that the described paths are applicable to essentially any operational situation encountered by the system.

Figure 14:
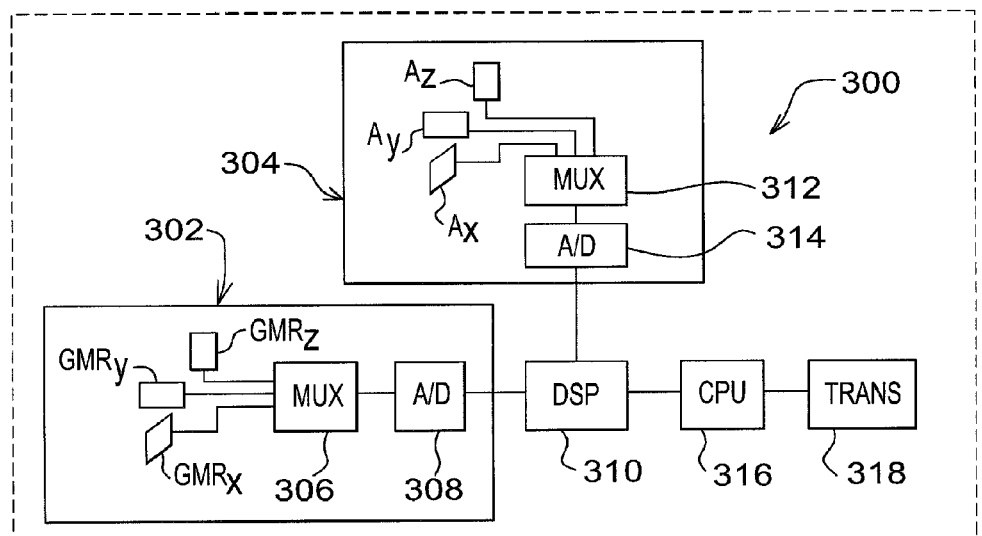
FIG. 14 is a diagrammatic block diagram illustrating a composite magnetic signal detection arrangement manufactured in accordance with the present invention and configured for incorporation into the drill head of a boring tool.

Attention is now directed to FIGS. 10 and 14 regarding a highly advantageous arrangement and associated method of tracking the positional relationship between drill head 54 and one or more buried underground lines using a composite magnetic signal detection arrangement generally indicated by the reference number 300 in FIG. 14. Detection arrangement 300 includes a magnetometer section 302 within a dashed line and an accelerometer section 304 within another dashed line. Magnetometer section 302 is highly advantageous in being configured to detect not only time varying locating fields such as magnetic locating fields 230 and 232 emitted from buried cables 32 and 34, respectively, but is also configured for detecting static magnetic fields including the earth's magnetic field. Details relating to this configuration will be discussed below following a description of other components included in detection arrangement 300.

Referring to FIG. 14, magnetometer section 302 includes a magnetometer arrangement configured for detecting magnetic fields (both static and time varying) along three orthogonal axes. In the present example, the use of giant magnetoresistive sensors (hereinafter GMR) is contemplated for this purposes, however, other suitable devices may be used. The orthogonally arranged GMR's in magnetometer section 302 are indicated as $GMR_x$, $GMR_y$ and $GMR_z$ using typical orthogonal axis nomenclature. Presently, the GMR is thought to be advantageous in the present application at least in part to the relatively small size of the device. For example, the dimensions of a typical GMR may be 0.2 inches by 0.3 inches. The GMR has been used, for example, on computer disk reading heads and as a compass sensor. GMR's typically have a frequency response that ranges from static to several mega Hertz. Irrespective of the particular form of the magnetic detector that is used, it should be appreciated that a composite magnetic signal is detected. That is, the signal, in this instance, will include both a static and a time varying component. The three GMR's are interconnected to a multiplexer 306 which sends multiplexed composite magnetic signal information to an analog to digital (A/D) converter 308. A converted digital signal produced from the composite magnetic signal by A/D 308 is then fed into a digital signal processor (DSP) 310. At the same time, accelerometer section 304 includes a triaxial accelerometer made up of three orthogonally arranged accelerometers indicated as $A_x$, $A_y$ and $A_z$. One device suitable for use as an accelerometer in the present application is the Analog Devices ADXL05. Like the GMR signals, three accelerometer signals are multiplexed using a multiplexer 312 and then digitally converted using an analog to digital converter 314. While the depicted configuration uses separate multiplexers and A/D converters for the magnetic and accelerometer signals, it should be appreciated that a single multiplexer and A/D may just as readily be used for both sets of signals.

Still referring to FIG. 14, in accordance with the method of the present invention, DSP 310 transforms the composite magnetic signal data to account for the instantaneous orientation of the drill head in view of data obtained from accelerometers $A_x$, $A_y$ and $A_z$. Thereafter, DSP 310 filters the transformed magnetic data to obtain both a static component and a time varying component at the induced signal frequency on the buried conductors (FIG. 10). The static and time varying components are then passed to a CPU 316 which uses the static component to determine the heading of the drill head and the dynamic component to determine proximity of the drill head to the conductor. It should be appreciated that the foregoing operations may all be performed within the drill head. Alternatively, the magnetic and accelerometer information may be transferred to an above ground location at almost any point in the block diagram of FIG. 14 for processing above ground. In the present example, information is passed to an above ground location using a transmission section 318 to be described at appropriate points below. The acceleration data may be presented above ground in the form of roll and pitch, as described in U.S. Pat. No. 5,767,678, which is commonly assigned with the present application, or as individual accelerations. The magnetic data may be presented in terms of components or as a north/south heading. The manner of presentation above ground may be determined by convenience to the operator or by secondary processing requirements such as, for example, automated steering of the drilling tool.

The present invention represents a significant advance in boring system technology through the use of a composite magnetic measurement from which static and dynamic components are separated. In the prior art, systems have been produced which incorporate accelerometers and/or magnetometers in a drill head. As examples, see U.S. Pat. Nos. 3,862,499 issued to Isham et al. and 4,875,014 issued to Roberts et al. However, the contemplated application in prior art systems of which the applicant is aware was limited to determining orientation parameters (i.e., pitch, roll and yaw or heading) of the drill head. These parameters may be integrated to estimate the path of the drill head. The present application, in contrast, is considered to provide sweeping advantages over these prior art configurations and methods by providing for determination of orientation parameters in conjunction with highly effective obstacle proximity detection using composite magnetic signal detection and processing. In this regard, all of the advantages previously discussed with regard to FIGS. 1-13 are equally applicable with the use of a composite magnetic signal. As an example, monitoring multiple in-ground lines using a composite magnetic signal may readily be performed, with regard to the locating signal transmitted from the buried lines, by either assigning different transmission frequencies to each line or by time sharing a single frequency.

Figure 15:
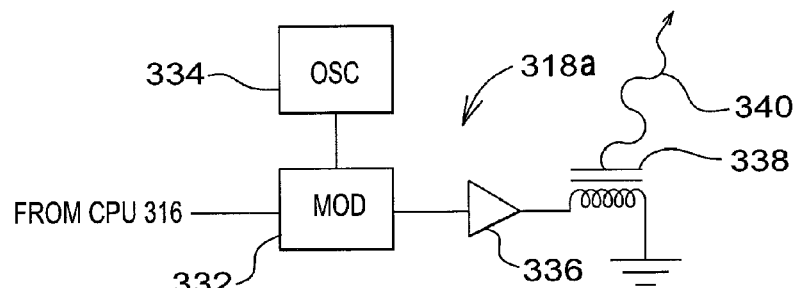
FIG. 15 is a diagrammatic block diagram illustrating a first implementation of a transmission section used in the detection arrangement of FIG. 14 using an RF carrier for transmission of information to an above ground location.

Turning to FIG. 15, a first implementation of transmission section 318 is generally indicated by the reference number 318a. Transmission section 318a includes a modulator 332 which is connected with an oscillator 334 producing a carrier frequency (not shown). Information to be transmitted to the above ground location is received from CPU 316 and modulated onto the carrier frequency by modulator 332. The modulated carrier frequency is then passed to an antenna 338 and transmitted as an RF signal 340 to the above ground location.

Figure 16:
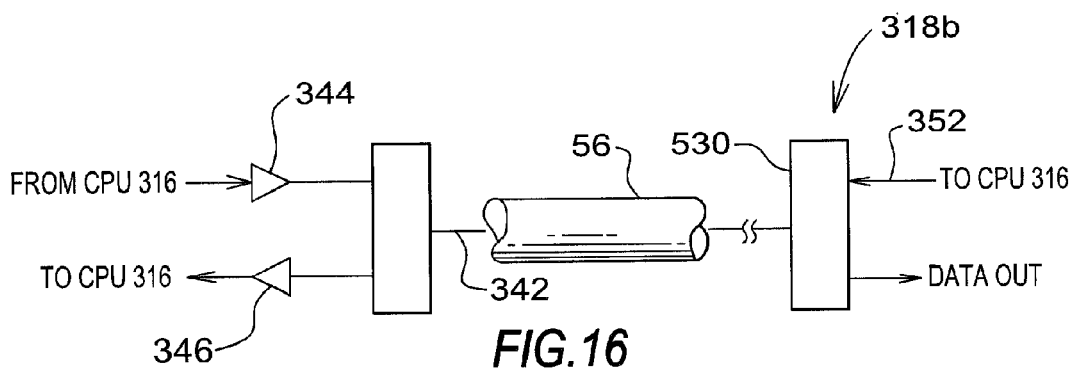
FIG. 16 is a diagrammatic block diagram illustrating a second implementation of another transmission section configured for use in the detection arrangement of FIG. 14 in cooperation with an isolated electrical conductor extending through the drill string.

Referring to FIG. 16, a second signal implementation of transmission section 318 is generally indicated by the reference number 318b. Transmission section 318b utilizes an electrically insulated conductor 342 which is fed down drill string 56 (only partially shown here, but also shown in FIG. 10) during drilling. Conductor 342 may be used to supply power to the instrumentation in the drill head and may also be used to send signals up and down the drill string. The drill string itself serves as a second conductor. The arrangement of FIG. 16 provides bilateral communications using a line driver 344 and a signal conditioner 346 both of which are connected to a first modulator/demodulator 348. Line driver 344 receives appropriate data from CPU 316, amplifies the data and transfers the data to modulator/demodulator 348. The latter modulates the data onto a carrier (not shown) and places the carrier onto conductor 342. At the drill rig (FIG. 10), the data is recovered by a second modulator/demodulator 350. Again, the manner of presentation or use of the data above ground may be determined in terms of convenience to the system operator or due to secondary processing requirements. Second modulator/demodulator 350 provides an input 352 for transfer of information down the drill string to CPU 316. It is considered that design of arrangement 300 for incorporation into a drill head and programming may be performed by those of ordinary skill in the art in view of this overall disclosure.

It should be understood that an arrangement for tracking the positional relationship between a boring tool and one or more buried lines and its associated method may be embodied in many other specific forms and produced by other methods without departing from the spirit or scope of the present invention. Therefore, the present examples are to be considered as illustrative and not restrictive, and the invention is not to be limited to the details given herein, but may be modified within the scope of the appended claims.

What is claimed is:

1. In a system in which a boring tool is moved through the ground by a drill string in a region which includes at least one electrically conductive in-ground line, an apparatus for monitoring a specific positional relationship between the boring tool and said line, said apparatus comprising:
   a first transmitter for generating a magnetic locating field from one of either said boring tool or at least an underground length of said line;
   a receiver carried by said boring tool if said field is generated from said line, or connected to said line if said field is generated from said boring tool, for detecting an intensity of said magnetic locating field indicative of the positional relationship between the boring tool and said line;
   a second transmitter carried by said boring tool for producing a locating signal; and
   a portable locator for using said locating signal to determine a position of said boring tool within said region and for indicating the detected intensity of said magnetic locating field generated from either one of said line or said boring tool.

2. The apparatus of claim 1 wherein said portable locator includes an arrangement for establishing the specific positional relationship between said boring tool and said line.

3. The apparatus of claim 1 wherein the first transmitter and the receiver are cooperatively configured to provide the intensity of the magnetic locating field so as to be unambiguously representative of said specific positional relationship between the boring tool and the line.

4. The apparatus of claim 1 wherein the detected intensity indicated by said portable locator represents a vector sum.

5. The apparatus according to claim 1 including a telemetry link forming one part of said receiver arrangement and forming another part of said portable locator for transmitting the detected intensity from said boring tool or said line to said portable locator.

6. The apparatus of claim 1 including an arrangement for establishing the specific positional relationship between said boring tool and said line based on the detected intensity of the magnetic locating field.

7. The apparatus of claim 6 wherein said portable locator includes said arrangement for establishing the specific positional relationship between said boring tool and said line.

* * * * *